(12) United States Patent
Einsele et al.

(10) Patent No.: US 11,207,983 B2
(45) Date of Patent: Dec. 28, 2021

(54) CONVERTER, ELECTRICAL DRIVE SYSTEM, AND METHOD FOR CHARGING AN ELECTRICAL ENERGY STORE

(71) Applicant: Robert Bosch GmbH, Stuttgart (DE)

(72) Inventors: Florian Einsele, Stuttgart (DE); Torsten Heidrich, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 16/336,497

(22) PCT Filed: Aug. 8, 2017

(86) PCT No.: PCT/EP2017/070058
§ 371 (c)(1),
(2) Date: Mar. 26, 2019

(87) PCT Pub. No.: WO2018/059808
PCT Pub. Date: Apr. 5, 2018

(65) Prior Publication Data
US 2020/0373770 A1 Nov. 26, 2020

(30) Foreign Application Priority Data

Sep. 27, 2016 (DE) ..................... 10 2016 218 599.3

(51) Int. Cl.
*B60L 7/10* (2006.01)
*B60L 58/15* (2019.01)
(Continued)

(52) U.S. Cl.
CPC .............. *B60L 7/10* (2013.01); *B60L 3/0046* (2013.01); *B60L 3/0061* (2013.01); *B60L 50/60* (2019.02);
(Continued)

(58) Field of Classification Search
CPC ........ H02J 7/0036; H02J 7/16; H02J 2207/20; B60L 7/10; B60L 53/20; B60L 50/60;
(Continued)

(56) References Cited

U.S. PATENT DOCUMENTS 4,012,667 A * 3/1977 Ishida ................. H02H 7/16
361/16
4,734,634 A * 3/1988 Kito ................. H02P 29/025
318/778
(Continued)

FOREIGN PATENT DOCUMENTS

CN          102470811 A      5/2012
CN          105189186 A     12/2015
(Continued)

OTHER PUBLICATIONS

International Search Report for Application No. PCT/EP2017/070058 dated Oct. 18, 2017 (English Translation, 2 pages).

*Primary Examiner* — Phallaka Kik
(74) *Attorney, Agent, or Firm* — Michael Best & Friedrich LLP

(57) ABSTRACT

A system for charging an electrical energy store by means of a converter. The converter monitors an electrical connection between the converter and the electrical energy store. If an interruption of the electrical connection between the converter and the electrical energy store is detected, for example, the opening of a circuit breaker between the electrical energy store and the converter, the further provision of electrical power for charging the electrical energy store through is immediately prevented by the converter.

10 Claims, 1 Drawing Sheet

(51) Int. Cl.
  *B60L 53/20* (2019.01)
  *B60L 50/60* (2019.01)
  *B60L 58/10* (2019.01)
  *B60L 3/00* (2019.01)
  *H02J 7/36* (2006.01)
  *H02J 7/16* (2006.01)
  *B60K 6/28* (2007.10)
  *H02P 27/06* (2006.01)
  *H02J 7/00* (2006.01)

(52) U.S. Cl.
  CPC ............... *B60L 53/20* (2019.02); *B60L 58/10* (2019.02); *B60L 58/15* (2019.02); *H02J 7/0036* (2013.01); *H02J 7/16* (2013.01); *B60K 6/28* (2013.01); *B60L 2210/00* (2013.01); *B60Y 2200/91* (2013.01); *B60Y 2200/92* (2013.01); *B60Y 2300/91* (2013.01); *H02J 2207/20* (2020.01); *H02P 27/06* (2013.01)

(58) Field of Classification Search
  CPC ........ B60L 58/15; B60L 58/10; B60L 3/0046; B60L 3/0061; B60L 2210/00; B60K 6/28; B60Y 2200/91; B60Y 2200/92; B60Y 2300/91; H02P 27/06; H02M 3/57; H02M 3/3351; H02M 7/53873; H02M 7/58; H02M 5/225; H02H 7/12; H02H 7/10; H03K 17/00; H04N 5/63; H01H 51/34
  USPC .......................... 320/137, 140, 135; 363/106
  See application file for complete search history.

(56) References Cited

U.S. PATENT DOCUMENTS

| | | | | |
|---|---|---|---|---|
| 6,172,863 | B1* | 1/2001 | Ito | H01H 33/593 |
| | | | | 323/908 |
| 8,179,086 | B2* | 5/2012 | Nakaso | B60L 50/61 |
| | | | | 320/104 |
| 8,476,865 | B2* | 7/2013 | Iwanaga | B60L 53/14 |
| | | | | 320/104 |
| 9,842,709 | B2* | 12/2017 | Zheng | H02H 3/08 |
| 10,418,915 | B2* | 9/2019 | Iwata | H02M 1/00 |
| 2009/0243523 | A1 | 10/2009 | Tanaka et al. | |
| 2014/0232304 | A1 | 8/2014 | Sekiya et al. | |
| 2015/0236611 | A1* | 8/2015 | Nakazawa | H02M 7/46 |
| | | | | 363/123 |
| 2019/0190254 | A1* | 6/2019 | Parikh | H01H 9/56 |

FOREIGN PATENT DOCUMENTS

| | | | |
|---|---|---|---|
| DE | 102008004202 | 7/2009 | |
| DE | 102013215704 | 2/2015 | |
| EP | 1006655 A2 | 6/2000 | |
| JP | H05177496 A | 7/1993 | |
| JP | 07105993 A * | 4/1995 | ............ H01M 12/08 |
| JP | 2001086643 A | 3/2001 | |
| JP | 2015198461 A | 11/2015 | |
| WO | 2014073058 A1 | 5/2014 | |

* cited by examiner

CONVERTER, ELECTRICAL DRIVE SYSTEM, AND METHOD FOR CHARGING AN ELECTRICAL ENERGY STORE

BACKGROUND OF THE INVENTION

The present invention relates to a power converter for charging an electrical energy store, an electrical drive system comprising a power converter, and a method for charging an electrical energy store.

In electrical drive systems, for example, as used in electric or hybrid vehicles, an electric machine may be activated by an inverter. During operation, the inverter is connected to an electrical energy source, for example, a traction battery. A disconnecting device is provided between the electrical energy source and the inverter, which can interrupt the electrical connection between the energy source and the inverter. In a generator mode, the electric machine can feed power in the direction of the electrical energy source via the inverter. In this operating mode, the inverter functions as a controlled rectifier.

During the feeding of electrical energy from the electric machine into the traction battery, the electrical connection between the traction battery and the inverter can be interrupted via the disconnecting device. The electrical energy from the machine initially flows into an intermediate-circuit capacitor of the inverter, and a voltage rise occurs in this intermediate-circuit capacitor. If the voltage at the intermediate-circuit capacitor exceeds a predetermined value, the generator mode of the electric machine can be terminated.

The publication DE 10 2013 215 704 A1 discloses a battery system comprising a battery disconnection unit and a battery control unit. The battery disconnection unit is used for disconnecting a battery arrangement from a consumer. The battery disconnection unit is combined into an assembly with a battery control unit for controlling the operation of the battery arrangement.

The publication DE 10 2008 004 202 A1 discloses a method for detecting a short circuit and/or an interruption of an electrical conductor for a vehicle. For this purpose, a signal pattern is modulated onto an electrical conductor, said signal pattern being influenced by a conductor state. As a function of this influence, detection of a short circuit and/or an interruption of the conductor takes place.

SUMMARY OF THE INVENTION

The present invention discloses a power converter, an electric drive system, and a method for charging an electrical energy store.

Accordingly, the following is provided:

A power converter for charging an electrical energy store. The electrical energy store may be connected to the power converter via a circuit breaker. The power converter comprises a detector appliance. The detector appliance is designed to detect an opening of the circuit breaker between the power converter and the electrical energy store. The power converter is furthermore designed to interrupt a provision of electrical energy to the electrical energy store if the detector appliance detects an opening of the circuit breaker.

Furthermore, the following is provided:

An electrical drive system comprising a power converter according to the present invention, an electric machine, and an energy storage system. The electric machine is connected the power converter. Furthermore, the electric machine is designed to provide to provide electrical energy to the power converter in a generator mode. The energy storage system comprises an electrical energy store and a circuit breaker. The electrical energy store of the energy storage system is electrically connectable to the power converter via the circuit breaker.

Furthermore, the following is provided:

A method for charging an electrical energy store by means of a power converter which is connected to the electrical energy store via a circuit breaker. The method comprises a step for monitoring the switching state of the circuit breaker during the charging of the electrical energy store. In particular, an opening of the circuit breaker is detected during the monitoring. Furthermore, the method comprises a step for interrupting the provision of electrical energy to the electrical energy store, if an opening of the circuit breaker between the power converter and the electrical energy store is detected during the monitoring of the switching state of the circuit breaker.

The present invention is based on the knowledge that a very rapid voltage rise may occur when charging an electrical energy store via a power converter, if a circuit breaker between the power converter and the electrical energy store is suddenly opened during the charging. Due to a very steep voltage rise gradient dU/dt, the voltage may thus rise very rapidly when opening circuit breaker. To protect the components, the maximum voltage arising in this case must be limited.

The present invention is therefore based on the idea of taking this knowledge into account, and in the case of an interruption of the electrical connection between the power converter and the electrical energy store, stopping the power flow in a manner which is sufficiently rapid to be able to prevent a voltage rise above a dangerous, component-damaging limit.

For this purpose, in the power converter, it is provided to continuously monitor the electrical connection between the power converter and the electrical energy source to be charged, and to immediately detect an interruption as may occur, for example, by opening a circuit breaker between the power converter and the energy store. If such an opening of the circuit breaker is detected, the power converter then immediately interrupts the provision of the electrical energy to the electrical energy store. By rapidly interrupting the charging process, charging of the intermediate-circuit capacitor in the power converter to a dangerously high voltage level is prevented. Thus, the voltage in the intermediate circuit remains at a manageable voltage level which does not result in damage to the connected components. In this manner, a failure or a reduction of the service life of the power converter may be prevented. Additional costly and possibly error-prone protective measures for preventing voltage overshoots are thus not required. As a result, the manufacturing cost drops, and the required packaging space of the power converter may be reduced.

According to one embodiment, the detector appliance comprises a device for monitoring a conductor between the power converter and the electrical energy store. In particular, by monitoring the conductor between the power converter and the electrical energy store, a potential interruption due to opening of the circuit breaker may be immediately detected.

According to one embodiment, the detector appliance comprises a device for detecting a switching state of the circuit breaker. For example, an additional contact or an additional sensor device may be provided at the circuit breaker, which provides information about the switching state of the circuit breaker. This information may be evaluated by the detector appliance of the power converter.

According to one embodiment, the detector appliance comprises a device for evaluating an activation signal for the circuit breaker. By evaluating an activation signal for the circuit breaker, no additional structural measures or circuits are required for determining the switching state of the circuit breaker. According to one embodiment of the electrical drive system, the circuit breaker is connected to the detector appliance by means of a signal line. Via this signal line, information about the instantaneous switching state of the circuit breaker may be immediately provided to the detector appliance.

According to one embodiment, the electrical drive system comprises a control appliance. This control appliance is designed to activate the circuit breaker of the energy storage system. Furthermore, the control appliance is connected to the detector appliance. In this way, the information about the activation of the circuit breaker may be provided directly to the detector appliance.

According to one embodiment, the power converter is designed to set a safe operating state at the electric machine if an opening of the circuit breaker has been detected. In particular, this safe operating state may comprise an active short circuit for the electric machine.

According to one embodiment of the method for charging the electrical energy store, the step of monitoring the switching state of the circuit breaker comprises monitoring the electrical connection between the power converter and the electrical energy store. In addition or alternatively, the step for monitoring the switching state may also comprise monitoring activation of the circuit breaker.

The above embodiments and refinements may be combined in any manner, to the extent that this is reasonable. Additional embodiments, refinements, and implementations of the present invention also comprise combinations of features of the present invention which are not explicitly mentioned and which have been previously described, or which are described below with respect to the exemplary embodiments. In particular, those skilled in the art will also add individual aspects to the respective basic forms of the present invention as improvements or refinements.

BRIEF DESCRIPTION OF THE DRAWINGS

The present invention will be described in greater detail below based on the exemplary embodiments specified in the schematic figures of the drawings. The following are shown.

DETAILED DESCRIPTION

Figure 1:
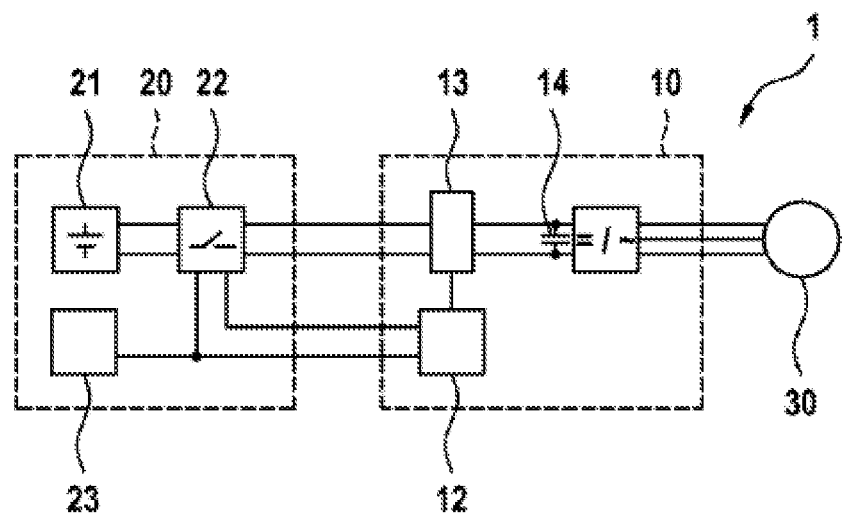
FIG. 1: a schematic representation of an electrical drive system comprising a power converter, according to one embodiment.

FIG. 1 shows a schematic representation of an electrical drive system 1 according to one embodiment. The electric drive system 1 comprises an electric machine 30, a power converter 10, and an electrical energy storage system 20. The electric machine 30 may be any electric machine, for example, a permanently excited synchronous machine or an asynchronous machine. In addition, any other electric machines which can provide electric power in a generator mode are also generally possible. The electric machine 30 is connected to a power converter 10. In a motor mode of the electric machine 30, the electric machine 30 may be activated via the power converter 10 by providing predetermined currents and/or voltages. In a generator mode, the electric machine 30 provides electric power to the power converter 10.

Furthermore, the power converter 10 is connected to an electrical energy storage system 20. The electrical energy storage system 20 comprises an electrical energy source 21 which is connected to the power converter 10 via a circuit breaker 22. The electrical energy source 21 may, for example, be a traction battery of an electric or hybrid vehicle. In addition, any other electrical energy stores are possible which are designed to provide electric power to the power converter 10, and to consume the electric power provided by the power converter 10 in charging mode. The circuit breaker 22 between the electrical energy store 21 and the power converter 10 can interrupt an electrical connection between the electrical energy source 21 and the power converter 10 as needed. For this purpose, the circuit breaker 22 may be activated by a control appliance 23 of the electrical energy storage system 20. The control appliance 23 may, for example, be a battery management system or the like.

In the exemplary embodiment depicted here, the power converter 10 may, for example, be a three-phase inverter which generates a three-phase alternating current from a direct current provided by the electrical energy storage system 20, and which provides this alternating current to the electric machine 30. However, the present invention is not limited to such three-phase inverters. In addition, any single-phase or multiphase inverters are possible, depending on the connected electric machine 30. Generally, any power converter 10 is possible which is adapted to the voltage provided by the electrical energy storage system 20 and the requirements of the electric machine 30.

Furthermore, the power converter 10 comprises a detector appliance 12. During the feeding of electrical energy from the power converter 10 into the electrical energy store 21, this detector appliance 12 monitors the electrical connection between the power converter 10 and the electrical energy store 21. If the detector appliance 12 determines that the electrical connection between the power converter 10 and the electrical energy store 21 has been interrupted, the power converter 10 is subsequently prompted to prevent further provision of electric power to the electrical energy store 21. If the power converter 10 were to continue to provide electrical power in the case of an interruption of the electrical connection between the power converter 10 and the electrical energy store 21, this electrical energy would flow into the intermediate-circuit capacitor 14 of the power converter 10. This would result in a sudden voltage rise across the intermediate-circuit capacitor 14. By rapidly interrupting the further provision of electrical energy via the power converter 10 after the electrical connection between the power converter 10 and the electrical energy store 21 has been interrupted, an excessive voltage rise across the intermediate-circuit capacitor 14 may be prevented.

After an interruption of the electrical connection between the power converter 10 and the electrical energy store 21 has been detected, the power converter 10 may in particular assume a switching state for a safe operating state of the connected electric machine 30. This safe operating state may, for example, comprise an active short circuit or a freewheeling state.

The detector appliance 12 can monitor the electrical connection between the power converter 10 and the electrical energy store 21, for example, via modulation of a high-frequency signal and detection of conductor reflections. If an interruption in the electrical connection between the power converter 10 and the electrical energy store 21, in particular the opening of the circuit breaker 22, is thereby detected, the further provision of electrical energy via the power converter 10 may subsequently be interrupted, and the electric machine 30 may optionally be put into a safe operating state.

Of course, any additional methods for monitoring the connection between the power converter 10 and the electrical energy source 21 and for detecting interruptions in this connection are also possible. Due to the very high propagation speed of the modulated high-frequency signals, there can be a very rapid detection of interruptions which occur, for example, the opening of a circuit breaker 22. As a result, the additional provision of electrical energy via the power converter 10 may be rapidly prevented, so that a dangerous voltage rise does not occur across the intermediate-circuit capacitor 14.

In addition or alternatively, it is also possible to monitor the switching state of the circuit breaker 22. For example, for this purpose, the instantaneous switching state of the circuit breaker 22 may be detected by means of an additional switching contact at the circuit breaker 22. Furthermore, any other sensors are possible for monitoring the switching state of the circuit breaker 22. The detected switching state of the circuit breaker 22 may, for example, be provided via an additional signal line at the detector appliance 12. Based on the signal transmitted via this signal line, the detector appliance 12 can immediately detect an opening of the circuit breaker 22 and subsequently prompt the power converter 10 to prevent an additional provision of electrical energy, and optionally to switch the electric machine 30 to a safe operating state.

Furthermore, it is also possible to provide an activation signal of the circuit breaker 22 directly to the detector appliance 12 as well, via a suitable signal line. The detector appliance 12 can then evaluate the activation signal for the circuit breaker 22 directly, and thereby detect an opening of the circuit breaker 22. For example, the circuit breaker 22 may be activated by a control appliance 23, for example, a battery management system or the like. This signal from the control appliance 23 may also be provided to the detector appliance 12 in parallel. Alternatively, it is also possible to provide an additional control signal from the control appliance 23 to the detector appliance 12. Based on this control signal for the circuit breaker 22, the detector appliance 12 may prompt the power converter 10 to interrupt further provision of electrical energy to the electrical energy store 21 if the circuit breaker 22 is to be opened based on the control signal. In addition, in this case, the electric machine 30 may also be switched here to a safe operating state.

Furthermore, of course, any additional signaling to the detector appliance 12 about the switching state of the circuit breaker 22 is possible. However, in this case, it must always be ensured that the information about the switching state of the circuit breaker 22 can be provided to the detector appliance 12 within a predetermined, very brief period. For example, the signaling about an opening of the circuit breaker 22 should be provided to the detector appliance 12 within a period of time of less than 1 µs, but at least within a period of less than 10 µs.

Figure 2:
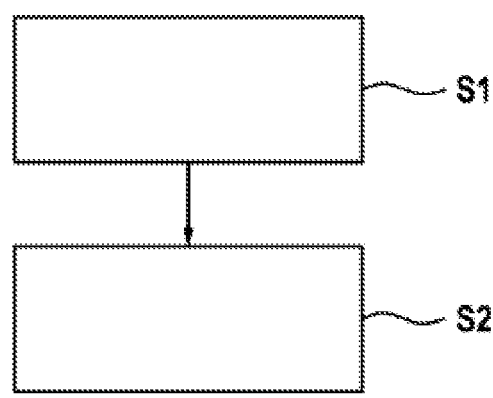
FIG. 2: a schematic representation of a flow chart, as based on a method according to one embodiment.

FIG. 2 shows a schematic representation of a flow chart as based on a method for charging an electrical energy store, according to one embodiment. In this case, the method is carried out via the previously described configuration made up of an electrical energy storage system, a power converter, and an electric machine in generator mode. The electric machine 30 is thus in generator mode and provides electrical energy to the power converter 10. The power converter 10 converts the provided electrical energy to a voltage which is suitable for charging an electrical energy store 21 in the energy storage system 20. During this charging of the electrical energy store 21, in step S1, the switching state of the circuit breaker 22 between the electrical energy store 21 and the power converter 10 is monitored. Preferably, continuous monitoring of the switching state of the circuit breaker takes place. Generally, however, periodic monitoring of the switching state of the circuit breaker having a period duration which is as brief as possible, preferably less than 1 µs, is also possible.

If it is detected during the monitoring of the switching state of the circuit breaker 22 that the circuit breaker 22 is opened, in step S2, an interruption of the provision of electrical energy to the electrical energy store 22 via the power converter 10 takes place. In this case, after detection of the opening of the circuit breaker 22, it is in particular possible to switch the electric machine 30 to a safe operating state, for example, a freewheeling state or an active short circuit.

In summary, the present invention relates to the charging of an electrical energy store by means of a power converter. Here, the power converter monitors the electrical connection between the power converter and the electrical energy store to be charged. If an interruption of the electrical connection between the power converter and the electrical energy store is detected, for example, the opening of a circuit breaker between the electrical energy store and the power converter, the additional provision of electrical energy for charging the electrical energy store via the power converter is immediately prevented. In this way, dangerous voltage overshoots at the power converter may be prevented.

The invention claimed is:

1. A power converter for charging an electrical energy store which is connectable to the power converter via a circuit breaker, comprising:
   a detector appliance which is designed to detect an opening of the circuit breaker;
   wherein the power converter is designed to interrupt a provision of electrical energy to the electrical energy store if the detector appliance detects an opening of the circuit breaker.

2. The power converter as claimed in claim 1, wherein the detector appliance comprises a device for monitoring a conductor between the power converter and the electrical energy store.

3. The power converter as claimed in claim 1, wherein the detector appliance comprises a device for detecting a switching state of the circuit breaker.

4. The power converter as claimed in claim 1, wherein the detector appliance comprises a device for evaluating an activation signal for the circuit breaker.

5. An electrical drive system comprising:
   a power converter including
      a detector appliance which is designed to detect an opening of the circuit breaker;
   an energy storage system including an electrical energy store and a circuit breaker, the electrical energy store being electrically connectable to the power converter via the circuit breaker; and
   an electric machine which is electrically connected to the power converter and which is designed to provide electrical energy in a generator mode, wherein the power converter is designed to interrupt a provision of electrical energy to the electrical energy store if the detector appliance detects an opening of the circuit breaker.

6. The electrical drive system as claimed in claim 5, wherein the circuit breaker is connected to the detector appliance by means of a signal line.

7. The electrical drive system as claimed in claim 5, comprising a control appliance which is designed to activate the circuit breaker of the energy storage system wherein the control appliance is furthermore connected to the detector appliance.

8. The electrical drive system as claimed in claim 5, wherein the power converter is designed to set a safe operating state at the electric machine if an opening of the circuit breaker has been detected.

9. A method for charging an electrical energy store by means of a power converter which is connected to the energy store via a circuit breaker, comprising the steps of:
  monitoring the switching state of the circuit breaker during a provision of electrical energy to the electrical energy store;
  interrupting the provision of electrical energy to the electrical energy store if the circuit breaker between the power converter and the electrical energy store is opened.

10. The method as claimed in claim 9, wherein the monitoring of the switching state of the circuit breaker comprises either or both monitoring the electrical connection between the power converter and the electrical energy store and, monitoring the activation of the circuit breaker.

\* \* \* \* \*